Patented Dec. 31, 1935

2,026,106

UNITED STATES PATENT OFFICE 2,026,106

METHOD OF MAKING A MOLDING COMPOSITION

Carlo Stresino, Milwaukee, Wis., assignor to A. O. Smith Corporation, Milwaukee, Wis., a corporation of New York No Drawing. Application August 3, 1934, Serial No. 738,289

4 Claims. (Cl. 260—2)

This invention relates to methods for making a molding composition from wood, phenyl chloride, and the sulphite liquor produced in the sulphite process for making wood fibers.

In the manufacture of chemical wood pulp or wood fiber by the sulphite process, wood is cooked in a water solution which contains the sulphite radicle of sulphurous acid. Although the sulphite liquor which results from this cooking holds in solution much of the noncellulosic constituents of wood, it has been of little value in the past and represents a waste product of the sulphite pulp industry. This sulphite liquor is of complex chemical constituency and there is much about its composition that is not thoroughly understood, but it appears that many of its constituents may be generally described as sulphonated lignins. The lignins are noncellulosic constituents of wood.

This invention utilizes sulphite liquor, which is inexpensive because it has heretofore been of little or no use, in the production of a molding powder from which useful molded articles may be produced.

In accordance with the invention, wood is impregnated with sulphite liquor and the impregnated wood is heated with phenyl chloride to cause a reaction to occur. The sulphite liquor used for impregnating the wood may be sulphite liquor as it comes from the sulphite cookers. Preferably, however, the sulphite liquor is concentrated by evaporation, and while it is still hot, wood chips or shavings are thrown in. Satisfactory results are obtained by the use of wood in such amounts as to give about 60 parts of wood impregnated with 40 parts of dry residue from the sulphite liquor.

The impregnated wood chips are finely ground and made into a paste with phenyl chloride and water. Preferably the chips or shavings are dried after impregnation with the sulphite liquor and before they are ground, but they may be ground wet if desired. The amount of phenyl chloride which is used will be governed by the quality of the product desired, and the cost that is permissible. In general, an improvement in the quality of the molded articles is produced by an increase in the amount of phenyl chloride used in the preparation of the molding compound, and an increase in the amount of phenyl chloride is accompanied by an increase in the cost of raw materials. Consequently the amount of phenyl chloride will be governed by the nature of the properties desired in the finished article.

A molding powder that produces molded articles suitable for many purposes is obtained by the use of 10 parts of phenyl chloride with 60 parts of ground wood impregnated with 40 parts of sulphite liquor. The phenyl chloride is dispersed in water and made into a paste with the ground wood. The amount of water used is not critical, its purpose being to effect a more uniform dispersion of the phenyl chloride throughout the ground wood than could be readily obtained without it. The paste is heated for some three hours at about 200° C. in a closed container or autoclave. A black cake is formed by the reaction, and after pulverizing to produce a molding powder is ready for molding. For molding small articles the pressure may be about 500–2000 pounds per square inch applied from 5 to 35 minutes at a temperature of about 160°–150° C. The molded articles formed from the molding composition are black in color and have an appearance not unlike that of articles molded from a phenol formaldehyde resin, filling material, and black pigment.

While the invention has been described in terms of a particular embodiment, variations can be made without departing from the spirit of the invention. Thus the ingredients can be used in different proportions; or wood flour instead of wood chips or shavings can be impregnated with sulphite liquor and then digested with phenyl chloride.

I claim:

1. The method of preparing a molding composition which comprises impregnating wood with sulphite liquor, and heating the impregnated wood with phenyl chloride to reaction temperatures for a sufficient length of time to cause chemical reaction.

2. The method of preparing a molding composition which comprises impregnating wood with sulphite liquor, grinding the wood after impregnation, and heating the ground wood with phenyl chloride to reaction temperatures for a sufficient length of time to bring about chemical reaction.

3. The method of preparing a molding composition which comprises impregnating wood with sulphite liquor in such proportions as to give about 60 parts of wood to 40 parts of dry sulphite liquor residue, grinding the impregnated wood, making a paste of the ground wood with water and about 10 parts of phenyl chloride, heating the paste for about 3 hours at a temperature of about 200° C., and pulverizing the product of the reaction.

4. In the manufacture of a molding composition, the step which comprises reacting phenyl chloride with wood impregnated with sulphite liquor.

CARLO STRESINO.